(12) United States Patent
Bender et al.

(10) Patent No.: US 10,621,646 B2
(45) Date of Patent: Apr. 14, 2020

(54) COGNITIVE RECOMMENDATION ENGINE TO SELECTIVELY IDENTIFY USING DATA ANALYTICS COMPLEMENTARY PRODUCT(S)

(71) Applicant: INTERNATIONAL BUSINESS MACHINES CORPORATION, Armonk, NY (US)

(72) Inventors: Michael Bender, Rye Brook, NY (US); Gregory J. Boss, Saginaw, MI (US); Jeremy R. Fox, Georgetown, TX (US); Rick A. Hamilton, II, Charlottesville, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 452 days.

(21) Appl. No.: 15/478,348

(22) Filed: Apr. 4, 2017

(65) Prior Publication Data
US 2018/0285958 A1    Oct. 4, 2018

(51) Int. Cl.
*G06Q 30/00* (2012.01)
*G06Q 30/06* (2012.01)

(52) U.S. Cl.
CPC ................. *G06Q 30/0631* (2013.01)

(58) Field of Classification Search
CPC .............................................. G06Q 30/06–08
USPC ................................................ 705/26.1–27.2
See application file for complete search history.

(56) References Cited

U.S. PATENT DOCUMENTS

| | | | |
|---|---|---|---|
| 7,206,753 | B2 | 4/2007 | Bancroft et al. |
| 7,653,576 | B2 | 1/2010 | Boss et al. |
| 9,311,666 | B2 | 4/2016 | Bhardwaj et al. |
| 2002/0091593 | A1 | 7/2002 | Fowler |
| 2005/0010494 | A1 | 1/2005 | Mourad et al. |
| 2006/0010142 | A1 | 1/2006 | Kim et al. |
| 2008/0140577 | A1 | 6/2008 | Rahman et al. |
| 2012/0316989 | A1 | 12/2012 | Wong et al. |

(Continued)

OTHER PUBLICATIONS

Mel et al., "The NIST Definition of Cloud Computing," National Institute of Standards and Technology, Information Technology Laboratory, Special Publication 800-145, Sep. 2011, (pp. 1-7).

(Continued)

*Primary Examiner* — Ethan D Civan
(74) *Attorney, Agent, or Firm* — Michael A. Petrocelli, Esq.; Kevin P. Radigan, Esq.; Heslin Rothenberg Farley & Mesiti P.C.

(57) ABSTRACT

A process is provided for identifying by a cognitive recommendation engine one or more complementary products. The process includes obtaining an indication that an individual has selected a product, and based on obtaining the indication, performing by the cognitive recommendation engine analytics on prior products-related data for the individual to produce a complementary items list of one or more complementary items to the product that are personal to the individual. Further, the processing includes identifying, by the cognitive recommendation engine, one or more commercially available complementary products corresponding to one or more items within the complementary items list, and providing identifying information for at least one commercially available product of the one or more commercially available products to the individual.

20 Claims, 9 Drawing Sheets

100

(56) References Cited

U.S. PATENT DOCUMENTS

2013/0304579 A1 11/2013 Kannan et al.
2015/0142606 A1* 5/2015 Hafeez ............... G06K 9/00671
705/26.62

OTHER PUBLICATIONS

International Business Machines Corporation (IBM), "z/Architecture Principles of Operation," IBM® Publication No. SA22-7832-10, Eleventh Edition, Mar. 2015, pp. 1-1732.
International Business Machines Corporation (IBM), "Power ISA™ Version 2.07B," International Business Machines Corporation, Apr. 9, 2015, pp. 1-1527.
Bender et al., "Cognitive Expansion of User Acceptance Criteria", U.S. Appl. No. 15/152,968, filed May 12, 2016 (49 pages).
Bender et al., "Smart Sensor-Based Consumer Service Optimization", U.S. Appl. No. 15/402,006, filed Jan. 9, 2017 (45 pages).

* cited by examiner

400 — IDENTIFYING ONE OR MORE COMPLEMENTARY PRODUCTS, INCLUDING:

- OBTAINING AN INDICATION THAT AN INDIVIDUAL HAS SELECTED A PRODUCT;

- BASED ON OBTAINING THE INDICATION THAT THE INDIVIDUAL HAS SELECTED THE PRODUCT, PERFORMING BY A COGNITIVE RECOMMENDATION ENGINE ANALYTICS ON PRIOR PRODUCTS-RELATED INFORMATION PERSONAL TO THE INDIVIDUAL TO PRODUCE A COMPLEMENTARY ITEMS LIST OF ONE OR MORE COMPLEMENTARY ITEMS TO THE PRODUCT PERSONAL TO THE INDIVIDUAL;

- IDENTIFYING, BY THE COGNITIVE RECOMMENDATION ENGINE, ONE OR MORE COMMERCIALLY AVAILABLE COMPLEMENTARY PRODUCTS CORRESPONDING TO ONE OR MORE ITEMS WITHIN THE COMPLEMENTARY ITEMS LIST; AND

- PROVIDING IDENTIFYING INFORMATION FOR AT LEAST ONE COMMERCIALLY AVAILABLE PRODUCT OF THE ONE OR MORE COMMERCIALLY AVAILABLE PRODUCTS TO THE INDIVIDUAL

410 — IN WHICH THE PERFORMING, BY THE COGNITIVE RECOMMENDATION ENGINE, ANALYTICS ON THE PRIOR PRODUCTS-RELATED INFORMATION PERSONAL TO THE INDIVIDUAL INCLUDES ANALYZING PRODUCTS-RELATED INFORMATION OBTAINED FROM ONE OR MORE DATABASES TO PRODUCE THE COMPLEMENTARY ITEMS LIST, THE ONE OR MORE DATABASES INCLUDING ONE OR MORE OF THE INDIVIDUAL'S SOCIAL MEDIA, IMAGES OF THE INDIVIDUAL, COMMENTS OR REVIEWS OF THE INDIVIDUAL, PRIOR PRODUCT SELECTIONS OF THE INDIVIDUAL, OR OTHER HISTORICAL PRODUCT-RELATED INFORMATION FOR THE INDIVIDUAL

420 — IN WHICH THE PRODUCT INCLUDES A CLOTHING PRODUCT, AND THE ONE OR MORE COMPLEMENTARY ITEMS IN THE COMPLEMENTARY ITEMS LIST INCLUDE COMPLEMENTARY CLOTHING ITEMS TO THE SELECTED CLOTHING PRODUCT PREFERRED BY THE INDIVIDUAL

FIG. 4A

430 — IN WHICH THE INDIVIDUAL SELECTS THE PRODUCT BY ONE OR MORE OF TAKING A PICTURE OF THE PRODUCT, REMOVING THE PRODUCT FROM A SHELF OR RACK AND HOLDING THE PRODUCT, OR SCANNING A CODE ASSOCIATED WITH THE PRODUCT

440 — IN WHICH THE OBTAINING INCLUDES OBTAINING VIA ONE OR MORE SENSORS AN INDICATION THAT THE INDIVIDUAL IS AT A CONSUMER VENUE, THE PRODUCT BEING SELECTED AT THE CONSUMER VENUE, AND WHEREIN PROVIDING THE IDENTIFYING INFORMATION INCLUDES PROVIDING THE IDENTIFYING INFORMATION TO A MOBILE DEVICE OF THE INDIVIDUAL

450 — FURTHER INCLUDING IDENTIFYING A LOCATION OF THE CONSUMER VENUE, AND IDENTIFYING ONE OR MORE OTHER CONSUMER VENUES WITHIN A SPECIFIED DISTANCE OF THE LOCATION, AND WHEREIN PROVIDING IDENTIFYING INFORMATION FURTHER INCLUDES PROVIDING IDENTIFYING INFORMATION FOR THE AT LEAST ONE COMMERCIALLY AVAILABLE PRODUCT, INCLUDING FOR EACH COMMERCIALLY AVAILABLE PRODUCT OF THE AT LEAST ONE COMMERCIALLY AVAILABLE PRODUCT, AN IDENTIFICATION OF AT LEAST ONE OF THE CONSUMER VENUE OR OTHER CONSUMER VENUE(S) OFFERING THE COMMERCIALLY AVAILABLE PRODUCT(S)

460 — IN WHICH THE IDENTIFYING FURTHER INCLUDES IDENTIFYING BY THE COGNITIVE RECOMMENDATION ENGINE COMMERCIALLY AVAILABLE PRODUCTS BY ACCESSING ONE OR MORE COMPANY DATABASES FOR AVAILABLE PRODUCT INVENTORY AT THE LOCATION OR WITHIN THE SPECIFIED DISTANCE OF THE LOCATION

470 — IN WHICH THE IDENTIFYING IDENTIFIES MULTIPLE COMMERCIALLY AVAILABLE PRODUCTS CORRESPONDING TO ONE OR MORE ITEMS WITHIN THE COMPLEMENTARY ITEMS LIST, AND THE METHOD FURTHER INCLUDES FILTERING BY THE COGNITIVE RECOMMENDATION ENGINE AVAILABLE PRODUCTS OF THE MULTIPLE COMMERCIALLY AVAILABLE PRODUCTS BASED, ON ONE OR MORE OF THE INDIVIDUAL'S PRIOR PRODUCT SELECTIONS, THE INDIVIDUAL'S CONSUMER VENUE PREFERENCES OR PRICE IN COMPARISON TO PRICE OF THE PRODUCT SELECTED

FIG. 4B

COGNITIVE RECOMMENDATION ENGINE TO SELECTIVELY IDENTIFY USING DATA ANALYTICS COMPLEMENTARY PRODUCT(S)

BACKGROUND

Within the retail environment, product merchandizing is typically company or store specific, with each company attempting to maximize sell transactions with each consumer. For instance, understanding by a company complementary products an individual may wish to purchase may be important to the retailer. Historically, cross-selling between stores owned by different entities has not occurred, even when the stores are geographically close, such as within the same shopping mall.

Advances are continually being sought to obtain commercial advantage in retailing, whether online retailing or conventional bricks and mortar retailing.

SUMMARY

Certain shortcomings of the prior art and additional advantages are provided through the provisions of a computer-implemented method of identifying one or more complementary products. The method includes obtaining an indication that an individual has selected the product, and based on obtaining the indication that the individual has selected a product, performing by a cognitive recommendation engine analytics on prior products-related information personal to the individual to produce a complementary items list of one or more complementary items to the product personal to the individual. Further, the method includes identifying, by the cognitive recommendation engine, one or more commercially available complementary products corresponding to one or more items within the complementary items list, and providing identifying information for at least one commercially available product of the one or more commercially available products to the individual.

Advantageously, disclosed herein is a cognitive system or recommendation engine, that learns or derives personal preferences of an individual selecting a product, and based on those preferences, produces a complementary items list of one or more complementary items to the selected product preferred by the individual. Further, the cognitive recommendation engine identifies one or more commercially available complementary products corresponding to one or more items within the complementary items list, and provides identifying information for the commercially available product(s) to the individual. In addition, the cognitive recommendation engine may identify for each available complementary product a location of the product, that is, a company or store from which the product may be purchased.

For instance, in evaluating the complementary items list, the cognitive recommendation engine may identify only commercially available complementary products within a given distance from a location of the individual at the time of selecting the product. Further, the cognitive recommendation engine may prioritize complementary products based on the unique individual's preferences, as well as availability of the products within a specified distance to the individual at the time of selecting the product. For example, the cognitive recommendation engine may identify that the individual has selected a clothing product, and based thereon, identify one or more complementary items to that clothing product using preferences of the individual learned (or derived) through analysis of one or more databases containing previous purchases of the individual, pictures of the individual, previous gifts of the individual, social media involving the individual, etc.

Advantageously, the facility or processing disclosed herein offers a mechanism to increase customer satisfaction with a retail establishment, which can be an important differentiator in the retail environment, particularly for more conventional retailing as stores attempt to keep pace with online retailing. Further, one or more aspects of the processing disclosed herein may be implemented or offered as a service to a retailer, such as to retailers within a shopping mall environment. In one or more embodiments, the service may be a cloud-based service, where the cognitive recommendation engine performs, for instance, various ones of the steps of processing, in accordance with one or more aspects of the present invention.

In one or more embodiments, the performing, by the cognitive recommendation engine, analytics on the prior products-related information personal to the individual may include analyzing prior products-related information within one or more databases to produce the complementary items list, where the one or more databases include one or more databases having the individual's social media, images of the individual, comments or reviews of the individual, prior products selections of the individual, or other historical, product-related information for the individual. Where the product is or includes a clothing product, the one or more complementary items in the complementary items list may include complementary clothing items or accessories to the selected product preferred by the individual.

In one or more implementations, the individual may select the product by taking a picture of the product, removing the product from a shelf or rack and holding the product, scanning a code associated with the product, or even purchasing the product, etc.

In one or more embodiments, the obtaining may include obtaining via one or more sensors an indication that the individual is at a consumer venue, with the product being selected at the consumer venue, and wherein providing the identifying information may include providing the identifying information to a mobile device of the individual. The method may further include identifying a location of the consumer venue, and identifying one or more other consumer venues within a specified distance of the location. In such a case, providing identifying information may further include providing identifying information for the at least one commercially available product, including for each commercially available product of the at least one commercially available product an identification of the consumer venue offering that commercially available product(s).

In one or more embodiments, the identifying may further include identifying by the cognitive recommendation engine commercially available products by accessing one or more company databases for available product inventory at the location or within the specified distance of the location. Further, in one or more implementations, the identifying may identify multiple commercially available products corresponding to one or more items within the complementary items list, and the method may further include filtering by the cognitive recommendation engine available products of the multiple commercially available products based on one or more of the individual's prior product selections, the individual's consumer venue preferences or price and comparison to price of the product selected.

In one or more other aspects, a system is provided for identifying one or more complementary products. The system includes a memory, and a processor communicatively coupled to the memory, wherein the system performs a method which includes obtaining an indication that an individual has selected a product, and based on obtaining the indication that the individual has selected the product, performing by a cognitive recommendation engine analytics on prior products-related information personal to the individual to produce a complementary items list of one or more complementary items to the product personal to the individual. Further, the method includes identifying, by the cognitive recommendation engine, one or more commercially available complementary products corresponding to one or more items within the complementary items list, and providing identifying information for the at least one commercially available product of the one or more commercially available products to the individual.

In one or more further aspects, a computer program product is provided for identifying one or more complementary products. The computer program product includes a computer readable storage medium having computer readable program code embodied therewith. The computer readable program code is executable by a processor to perform a method which includes obtaining an indication that an individual has selected a product, and based on obtaining the indication that an individual has selected a product, performing by a cognitive recommendation engine analytics on prior products-related information personal to the individual to produce a complementary items list of one or more complementary items to the product personal to the individual. Further, the method includes identifying, by the cognitive recommendation engine, one or more commercially available complementary products corresponding to one or more items within the complementary items list, and providing identifying information for at least one commercially available product of the one or more commercially available products to the individual.

Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 4A-4B depict a further embodiment of a process of identifying one or more complementary products, in accordance with one or more aspects of the present invention;

DETAILED DESCRIPTION

Figure 1:
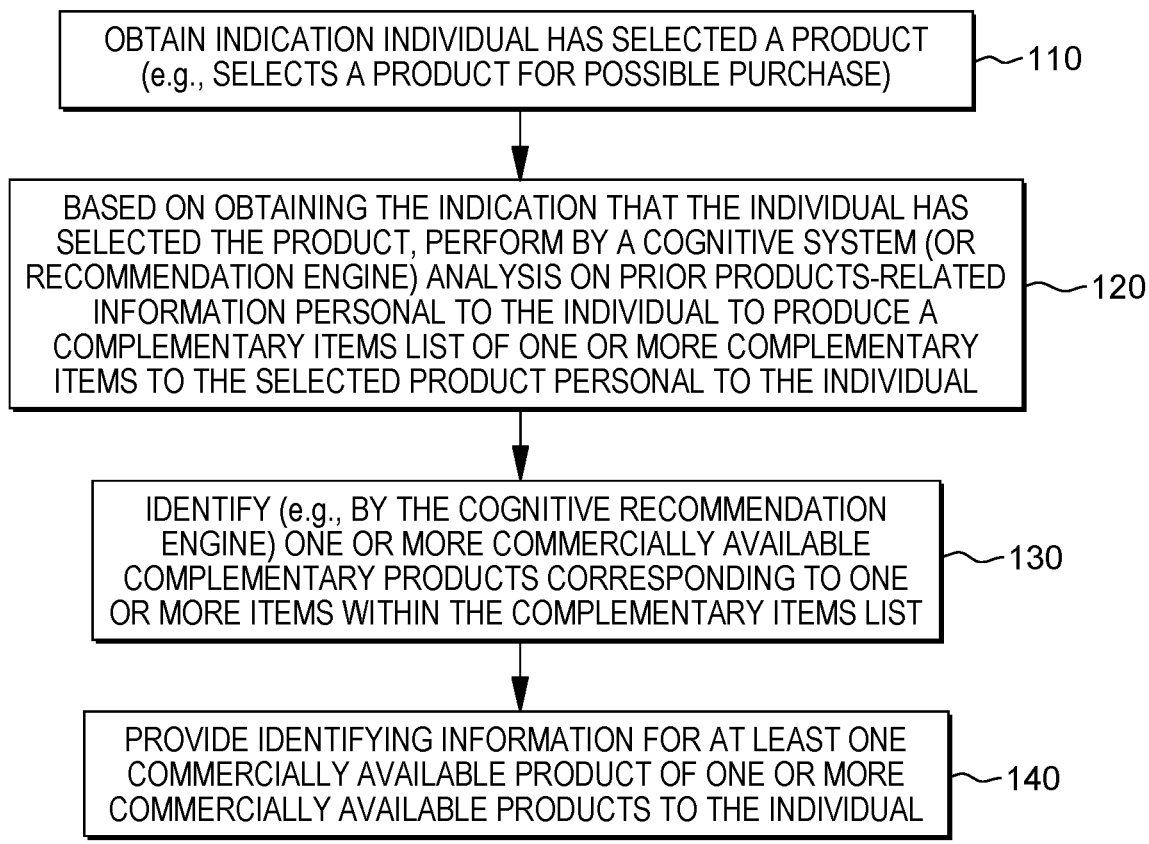
FIG. 1 depicts one embodiment of a process of identifying one or more complementary products, in accordance with one or more aspects of the present invention.

Aspects of the present invention and certain features, advantages and details thereof, are explained more fully below with reference to the non-limiting example(s) illustrated in the accompanying drawings. Descriptions of well-known materials, systems, devices, processing techniques, etc., are omitted so as to not unnecessarily obscure the invention in detail. It should be understood, however, that the detailed description and the specific example(s), while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application, for instance, for facilitating identifying one or more complementary products that are personal to an individual selecting a product.

Retailing continues to be an area of innovation to, for instance, facilitate commercial advantage in the marketplace. Understanding complementary items an individual may wish to purchase after selecting a product may be important to a company both in an online environment, and in a conventional store-based environment. The ability of a retailer to present complementary items to an individual tailored to that consumer's preferences could potentially increase sales for the company, and depending on the implementation, potentially for other companies, such as other retailers within the same geographic area to where the initial product is selected.

By way of example, an individual (or consumer) may wish to buy a product, as well as one or more complementary products at a retailer. This may lead to, for instance, three possible scenarios. The individual may skip the purchase of the product since they are unable to locate the complementary product(s) they are looking for, or the individual may buy the product, but later return it, because they could not locate the complementary product(s), or the individual may buy the product, as well as locate and buy the complementary product(s). The retailer preference would be to move as many customers to this last scenario as possible, thus increasing sales and customer satisfaction, as well as minimizing costs associated with handling returns.

Disclosed herein, in one or more aspects, are a computer-implemented method, system and computer program product implemented, at least in part, by (or including), a cognitive recommendation engine that identifies complementary products personal to an individual based on the individual having selected a product. This capability or facility may be utilized in a variety of retail environments, including online and conventional brick and mortar retail environments. In one or more advantageous embodiments, the processes disclosed herein may be utilized by multiple different retailers as a mechanism to cross-sell products. However, the processes also apply to a single retailer from which an individual has selected a product.

The complementary product selection processing is cognitive-based since each individual will typically have different complementary product preferences, which are factored into the selection process to obtain a complementary items list of one or more complementary items to a product selected by that individual, where the one or more complementary items are personal to (i.e., preferred by) the individual selecting the product. In one or more embodiments, the product may be any type of product which may be selected by an individual and have complementary items associated therewith. For instance, in one or more embodiments, the product may be a clothing product, and the one or more complementary items may be one or more complementary clothing items, or related accessories.

In one specific example, one or more aspects of the present invention may allow an individual consumer to select a product, for instance, select a product for purchase at a store, and to know if one or more complementary items of interest are available at that same store, or at a nearby location. For example, the nearby location may be within a specified distance of the store where the product is selected, such as within the same shopping mall, but at a different retailer. Further, in one or more embodiments, the cognitive recommendation engine may prioritize the complementary items, or more particularly, the identified complementary products, based on the unique individual's preferences, as well as, for instance, availability of one or more of the complementary products, and/or price of the complementary products.

By way of example, FIG. 1 depicts one embodiment of a process of identifying one or more complementary products 100, in accordance with one or more aspects of the present invention. As illustrated, process 100 includes obtaining an indication that an individual has selected a product 110. Selecting a product may occur in a number of ways. For instance, an individual may take a picture of the product, scan a barcode or other tag associated with the product, remove the product from a shelf or rack, which may be sensed by one or more sensors, such as one or more Internet of Things sensors or devices, purchase the product, etc. The indication may be forwarded using any of a variety of device or computer communication means. Note in this regard that device-to-device, device-to-computer, and computer-to-computer communications are well known in the art.

Based on obtaining the indication that the individual has selected the product, a cognitive system, or cognitive recommendation engine, performs analytics on prior products-related information personal to the individual to produce a complementary items list of one or more complementary items to the selected product personal to the individual 120. Note in this regard that the complementary item(s) may be a generic identification of a complementary item(s), whereas a complementary product may refer to a commercially available product within, for instance, the complementary items list generated by the cognitive recommendation engine for a particular individual based on the selected product.

Process 100 may further include identifying, for instance, by the cognitive recommendation engine, one or more commercially available complementary products that correspond to one or more items within the complementary items list 130, and providing identifying information for at least one commercially available product of the one or more commercially available products to the individual 140. For instance, providing the information may include forwarding identifying information for one or more commercially available complementary products to a computer, mobile device, etc. associated with the individual. Note in this regard that a mobile device may refer to any portable computing device, such as a mobile telephone, personal digital assistant (PDA), tablet, laptop computer, smartphone, smartwatch, Internet of Things device, etc. which can receive data packets over a wireless network.

Figure 2:
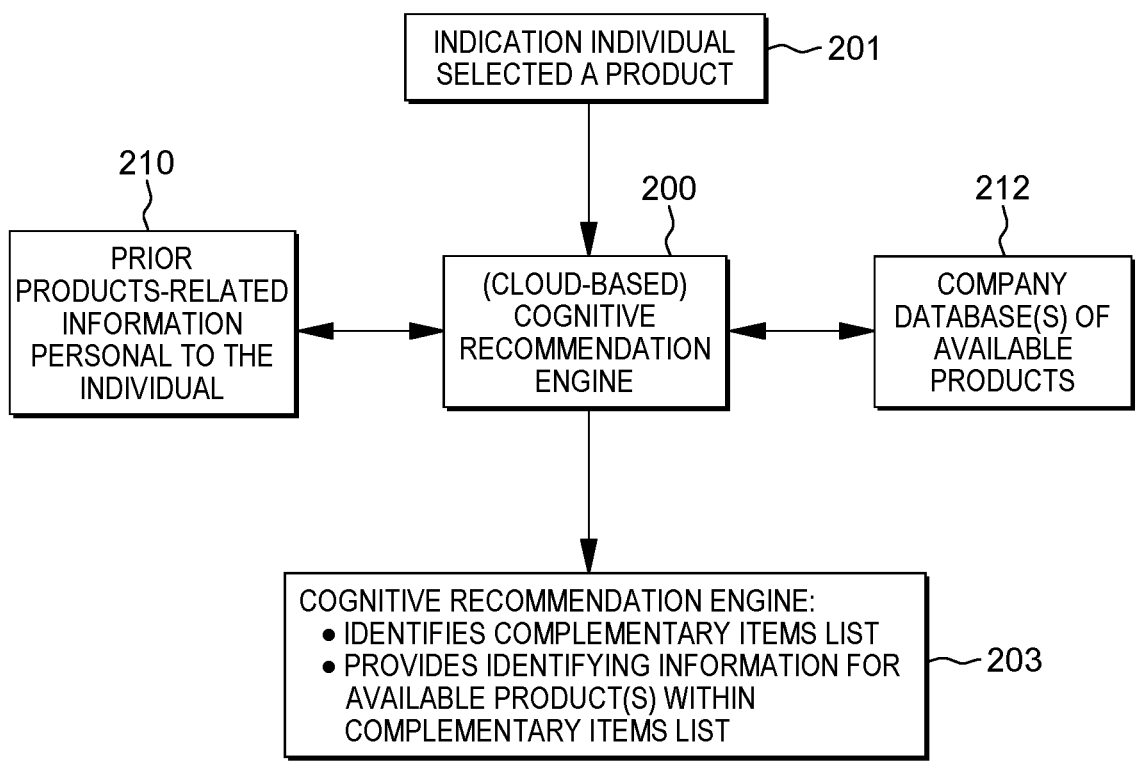
FIG. 2 depicts one embodiment of a system for implementing a process such as depicted in FIG. 1, in accordance with one or more aspects of the present invention.

FIG. 2 depicts further details of a system and process of identifying one or more complementary products, in accordance with one or more aspects of the present invention. As illustrated, the system and process include a cognitive system or cognitive recommendation engine 200, which in one or more embodiments, may be a cloud-based cognitive recommendation engine. The recommendation engine is cognitive in that the system learns individual preferences for complementary products to a product selected by an individual 201. Note that in one or more embodiments, the individual may have preregistered with the facility disclosed herein such that by forwarding an indication that a product has been selected, processing such as described herein is automatically initiated.

By way of example, in one or more embodiments, cognitive recommendation engine 210 may be, or utilize, for instance, a cloud-based system. One cognitive system is the Watson™ system available from International Business Machines Corporation of Armonk, N.Y., USA. The Watson™ system is an application of advanced natural language processing, information retrieval, knowledge representation and reasoning, and machine-learning technologies in the field of domain question answering. The Watson™ system is built on International Business Machines Corporation's DeepQA™ technology used for hypothesis generation, massive evidence gathering, analysis, and scoring.

As illustrated, cognitive recommendation engine 200 references prior products-related information personal to the individual 210 which may include or relate to information on previously used or liked products personal to the individual selecting the product. For instance, the prior products-related information 210 may be from one or more databases with or supporting social media, images stored on one or more mobile devices associated with the individual, or other storage mechanisms, such as cloud-based storage of images, other available pictures of the individual, such as via video camera monitoring, any prior recommendations of the system to the individual, along with the eventual individual action (for instance, did the individual purchase the recommended product) as well as any databases containing product comments, such as likes or dislikes, or other discussion of the individual to support identifying and/or ranking complementary items identified by the cognitive recommendation engine.

Based on analytical evaluation of the prior products-related information 210, cognitive recommendation engine identifies a complementary items list 203 for the individual's selected product 201. Note in this regard that the individual selecting, for instance, looking at, a particular product drives the cognitive system to identify complementary items, and that learned preferences are employed to generate the complementary items list. As a further step, the system, such as the cognitive recommendation engine, may review one or more company databases of available products 212 to identify particular commercially available complementary products falling within the complementary items list 203.

Figure 3A:
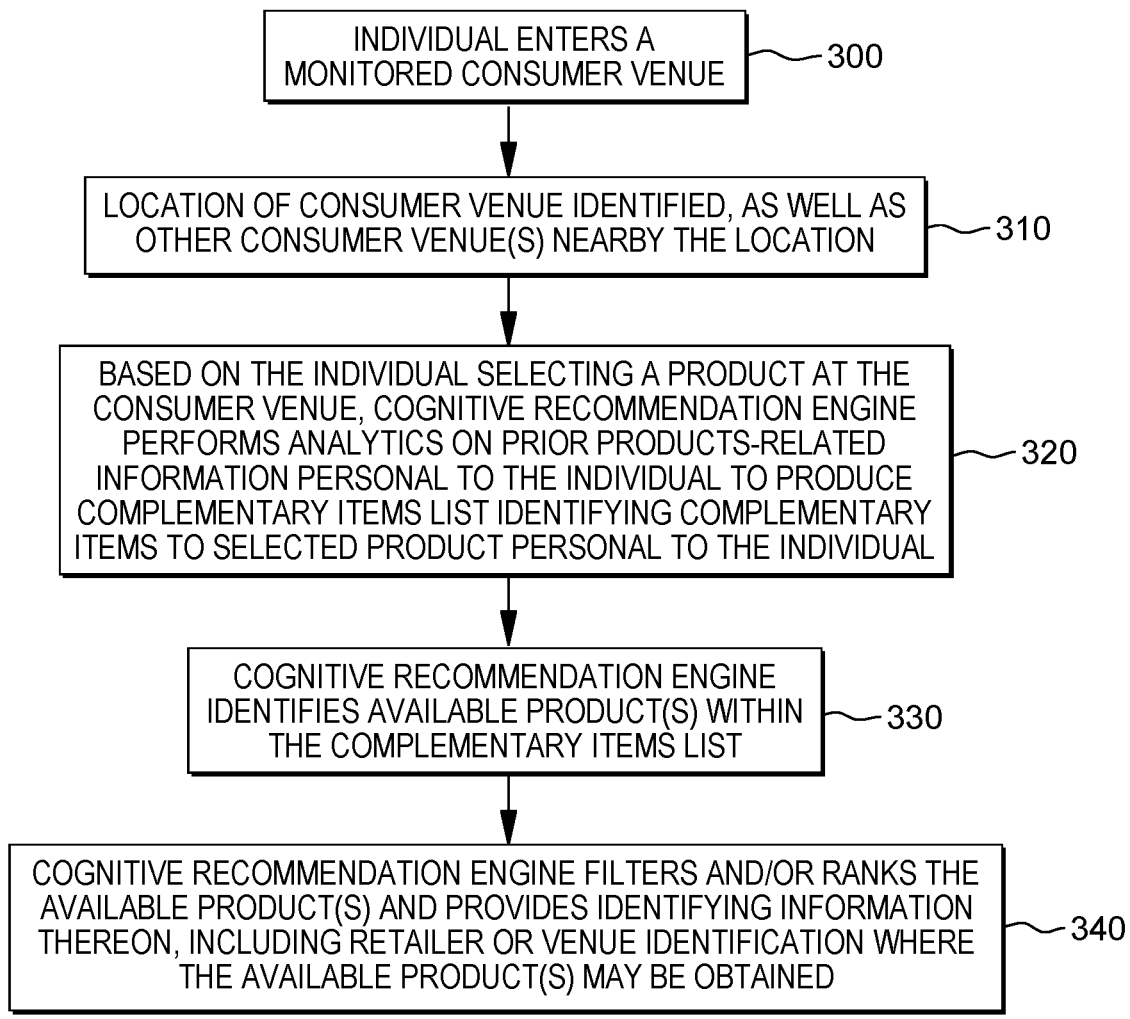
FIG. 3A depicts a further embodiment of a process of identifying one or more complementary products, in accordance with one or more aspects of the present invention.

By way of further example, FIG. 3A depicts another embodiment of a process of identifying one or more complementary products, in accordance with one or more aspects of the present invention. In this example, an individual (e.g., an individual pre-registered with the system) enters a monitored consumer venue, such as a retail store 300. For instance, a mobile device associated with the individual is identified by one or more broadcast beacons or sensors within the store. The location of the consumer venue is identified, and the individual may be automatically linked to any participating stores within a defined geographic area, that is, within a specified distance of the location of the venue that the individual has entered 310.

The individual selects a product. As noted, the selection of a product may occur in a variety of ways. For instance, the cognitive system may interact with registered Internet of Things devices at the consumer venue, cameras may identify the product that the individual is looking at, motion detectors or Internet of Things hangers could identify items that are picked up off a rack, or other approaches could be used. For example, the individual could scan a barcode or other tag associated with the product, or the individual could take a picture of the product, or purchase the product.

In one or more implementations, the individual could further identify the selected product as a gift, which could disable the cognitive system, or allow the system to continue for the identified person.

In one or more implementations, after a specified time (which may be configurable), the cognitive system or recommendation engine, may trigger to initiate analytics to identify a complementary items list. For instance, based on the individual's selecting a product at the consumer venue, the cognitive recommendation engine may perform analytics on prior products-related information personal to the individual to produce a complementary items list identifying complementary items to the selected product personal to the individual 320.

For example, the recommendation engine may review social media for pictures of the individual for similar style product to the product being selected, or review images of the individual, such as images stored on the mobile device of the individual, or the cloud for similar product matches, as well as other pictures available in one or more databases accessible through the internet to identify complementary items personal to the individual selecting the product. Still further, the cognitive recommendation engine may utilize previous recommendations to the individual, with eventual action (e.g., purchase yes or no) as additional input, as well as reviews, comments, likes or dislikes, etc., information provided by the individual to support identification of the complementary items list. In one or more embodiments, the engine may further rank of items within the complementary items list, for instance, based on the prior products-related information. Further, in one or more additional embodiments, the prior products-related information personal to the individual could also be ascertained by, for instance, an inventory of items within the individual's house, such as via pictures or storing purchased items information, to further enhance the database(s) of available information personal to the individual.

The cognitive recommendation engine may identify one or more available products within the complementary items list 330. For instance, the system may identify items local to the consumer venue where the product is selected. In one or more implementations, the cognitive system may produce a list of available products in one or more local stores, and the system may compare images and descriptions of items that are locally available to the individual, including comparing available inventory in the other consumer venues local to the individual which are participating in the service.

In one or more implementations, the cognitive recommendation engine may rank the available products and provides identifying information thereon, including a location of the venue offering the associated available product 340.

For instance, the cognitive system may compare the selected product to other products of the same type to obtain a price range within which the individual is selecting. The cognitive system may then look at the complementary items list, or more particularly, the available products corresponding to items in the complementary items list, and (for instance) reduce a recommendation ranking for one or more products that are inconsistent with the price range of the original product. Further, the cognitive system may eliminate or lower the ranking of any complementary product that would be of different quality (e.g., a diamond necklace with an inexpensive dress, expensive cowboy boots with inexpensive jeans, etc.). Further, the cognitive system may allow for additional filtering of the identified available complementary products, such as seasonal based filtering of products.

Figure 3B:
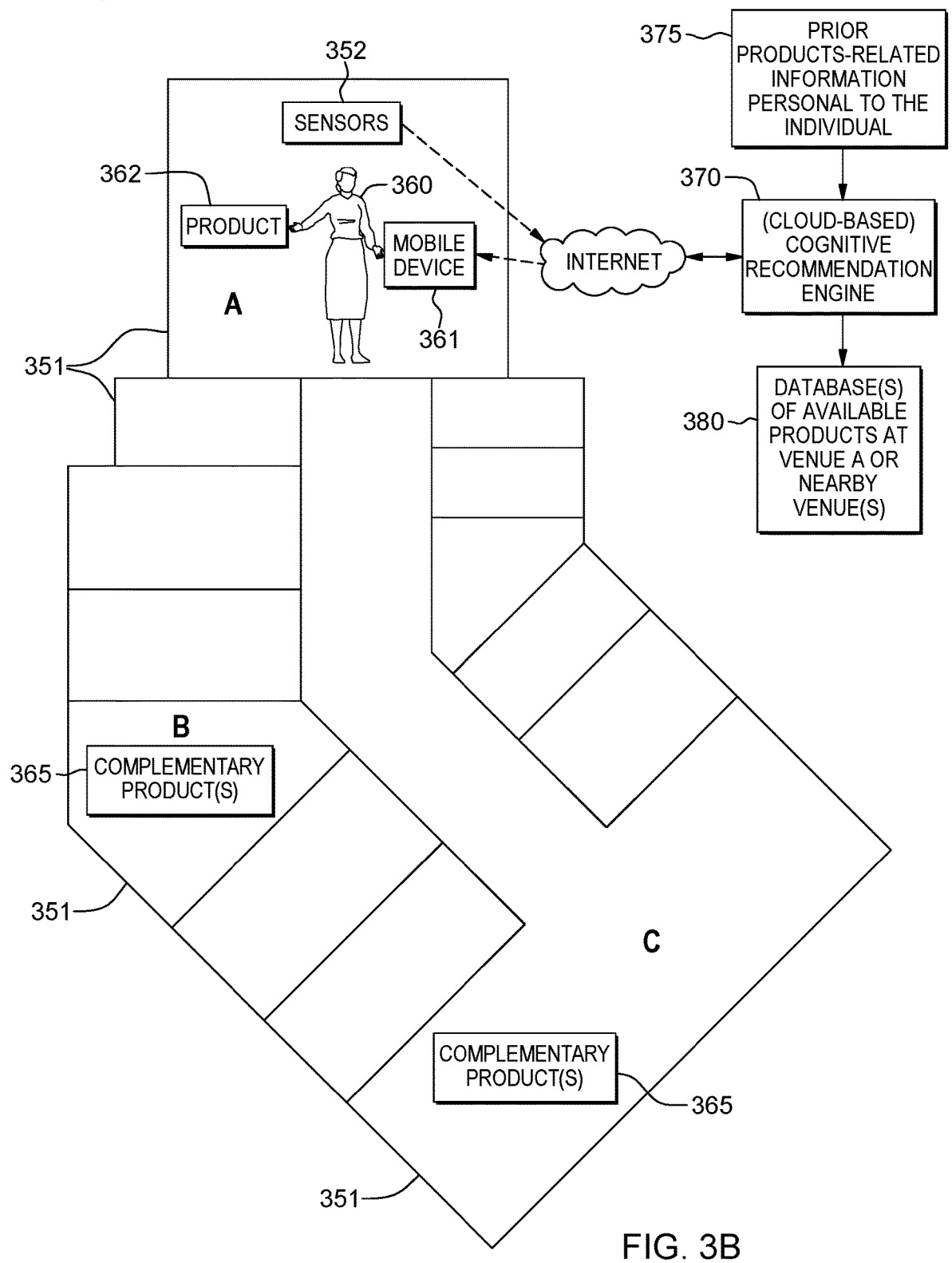
FIG. 3B illustrates an environment and system within which a process such as depicted in FIG. 3A may be implemented, in accordance with one or more aspects of the present invention.

FIG. 3B illustrates an environment and system example such as that described above in connection with FIG. 3A. In this example, a shopping mall 350 includes a consumer venue A 351 where an individual 360 has selected a product 362. The individual has a mobile device 361 which may have been read by one or more sensors or beacons 352 when the individual entered consumer venue A, with the registering information having been forward via the internet to cognitive recommendation engine 370. In one or more embodiments, cognitive recommendation engine 370 implements processing such as disclosed herein to identify a complementary items list. By way of example, cognitive recommendation engine 370 may be a cloud-based cognitive system, which references prior product-related information personal to the individual 375 to produce a complementary items list of one or more complementary items to the product 362 selected by the individual 360.

In one or more implementations, cognitive recommendation engine 370 may reference one or more company databases 380 of available products at venue A or at nearby consumer venues 351, and identify, by way of example, one or more complementary products 365 at consumer venue B 351 and consumer venue C 351 within shopping mall 350. As noted herein, consumer venues B & C may be different companies or retailers than consumer venue A at which the product is selected by the individual. Thus, the system disclosed herein envisions a cross-selling, whereby the cognitive recommendation engine identifies commercially available complementary products 365 at other retailers in the geographic area where the individual has selected a product (such as at other retailers participating in the service described herein).

In one or more embodiments, cognitive system 370 may provide identifying information on one or more commercially available products to the individual 360, for instance, to mobile device 361 associated with individual 360. The identifying information may include, in addition to identify the particular commercially available product that may be of interest, the retailer 351 with available inventory of the complementary product.

As a further example, the computer-implemented method, system and computer program product disclosed herein implemented (at least in part) by, or including, the cognitive recommendation engine, may be employed in a wide variety of situations to identify available complementary products, and even cross-sell available complementary products between companies.

As a specific example only, an individual A and an individual B may enter a department store in a mall. Both individuals select a similar blue shirt. Individual A takes a picture of the shirt to trigger the cognitive system to look for complementary products. Individual B scans the barcode associated with the shirt using a mobile device to trigger a similar action. The cognitive system learns that individual A prefers to wear blue shirts with a red stripped tie, while the system learns that individual B prefers to wear blue jeans with a blue shirt. The system then uses, for instance, global positioning system (GPS) technology to identify any consumer venues that are a part of a cooperative selling arrangement, that is, are participating in a service such as disclosed herein, and looks for red ties for individual A and jeans for individual B. Individual A may be presented with four retailers within the shopping mall that have red ties that may be of interest, while individual B may be presented with two retailers that sell jeans that may be of interest.

As a further specific example, an individual may select a blue shirt, and the cognitive system reviews prior purchases of the individual to see when purchasing a blue shirt in the past that the individual also purchased jeans, shorts, etc. The system may access the individual's social media account, as well as access pictures of the individual that have been authorized. The system determines that in roughly 75% of the pictures, the individual wears jeans with a blue shirt. The system may also have access to the individual's store of pictures and analyzes that the pictures and determines that in 60% of the pictures the individual wears blue jeans with a blue shirt, and in 20% of the pictures the individual wears black jeans. The system therefore ranks blue jeans higher than black jeans, and based on the configuration may present both as options to the individual. The system may also lookup what the individual has inventoried at home, as well as the stock keeping units (SKUs) and descriptions of items available at the shopping mall and presents a complementary items list. Filtering options may also be utilized to allow the individual to identify or specify items that may be of most interest.

As a further example, an individual may be looking at a black dress but can't decide if she should buy the dress. Historical analysis may show that the individual likes black dresses with a ruby necklace, and the dress price is $50. The cognitive system may eliminate any necklaces over $300 based on the cost of the dress being in the lower 25% range of black dresses available at the mall and thereby may reduce or filter available necklaces at the mall to the same percent range.

By way of further example, FIGS. 4A & 4B depict a method of identifying one or more complementary products, in accordance with one or more aspects of the present invention. As illustrated, identifying the one or more complementary products 400 may include obtaining an indication that an individual has selected a product and based on obtaining the indication, performing by a cognitive recommendation engine analytics on prior products-related information personal to the individual to produce a complementary items list of one or more complementary items personal to the individual. The process may further include identifying, by the cognitive recommendation engine, one or more commercially available complementary products corresponding to one or more items within the complementary items list, and providing identifying information for at least one commercially available product of the one or more commercially available products to the individual.

In one or more embodiments, the performing, by the cognitive recommendation engine, analytics on the prior products-related information may include analyzing prior products related information obtained from one or more databases to produce the complementary items list, the one or more databases including one or more of the individual's social media, images of the individual, comments or reviews of the individual, prior products selections of the individual, or other historical, product-related information for the individual 410.

In one or more embodiments, the product may be a clothing product, and the one or more complementary items in the complementary items list may include complementary items to the selected clothing product preferred by the individual 420.

In one or more implementations, selecting by the individual the product may include one or more of the individual taking a picture of the product, removing the product from a shelf or rack and holding the product, or scanning a code associated with the product 430.

In one or more embodiments, the obtaining may include obtaining via one or more sensors an indication that the individual is at a consumer venue, with the product being selected at the consumer venue, and providing the identifying information may include providing the identifying information to a mobile device of the individual 440. Further, in one or more implementations, the process may include identifying a location of the consumer venue, and identifying one or more other consumer venues within a specified distance of the location, and further the providing identifying information may include providing identifying information for the at least one commercially available product, including for each commercially available product of the at least one commercially available product an indication of at least one of the consumer venue or other consumer venue(s) offering the commercially available product(s) 450.

In one or more embodiments, the identifying may include identifying by the cognitive recommendation engine commercially available products by accessing one or more company databases for available product inventory at the location or within the specified distance of the location 460. Further, in one or more embodiments, the identifying may identify multiple commercially available products corresponding to one or more items within the complementary item's list, and the process may further include filtering by the cognitive recommendation engine available products of the multiple commercially available products based on one or more of the individual's prior products selections, the individual's consumer venue preferences or price and comparison to price of the product selected 470.

Further exemplary embodiments of a computing environment to implement one or more aspects of the present invention are described below with reference to FIGS. 5-7.

Figure 5:
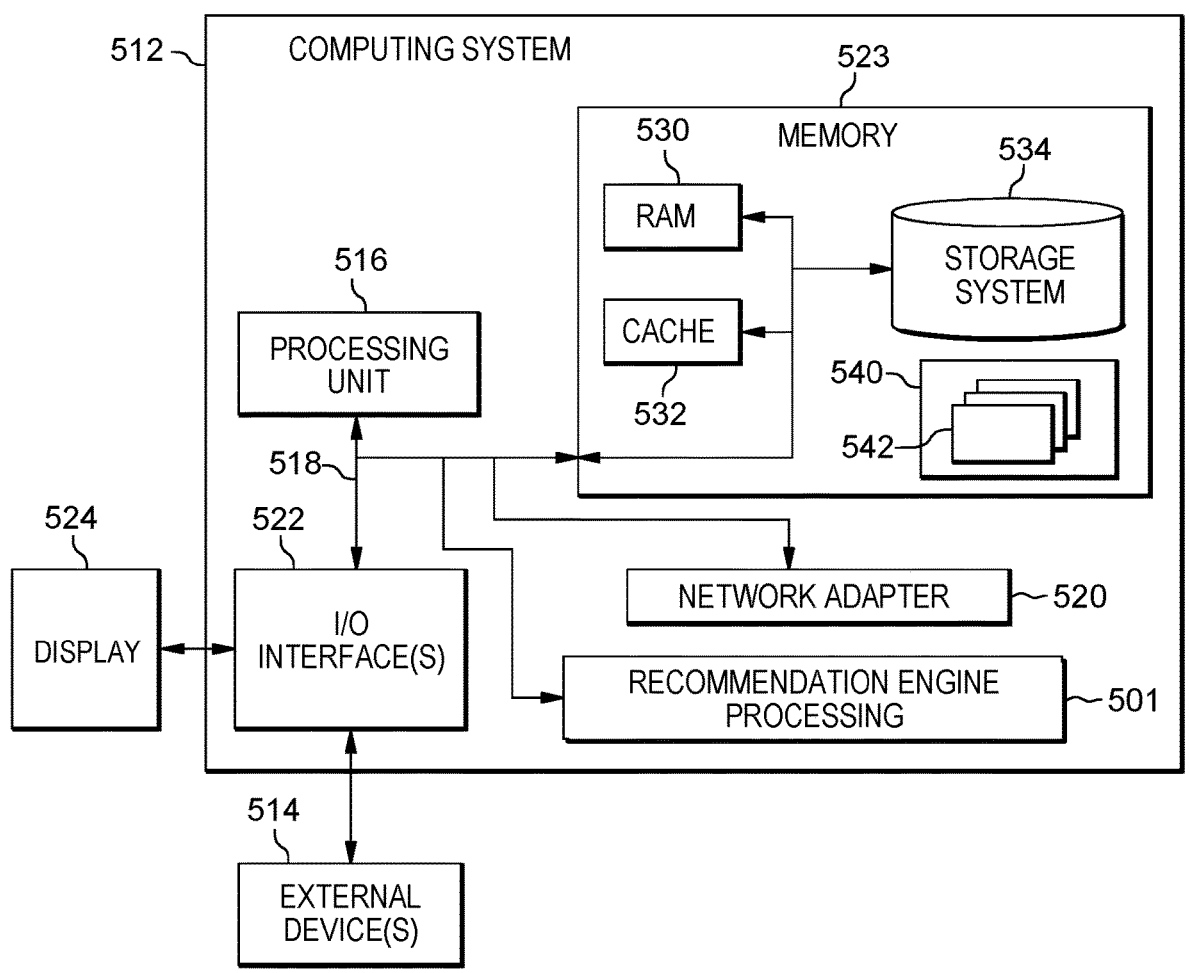
FIG. 5 depicts one embodiment of a computing system which may implement or facilitate implementing recommendation engine processing, in accordance with one or more aspects of the present invention.

By way of further example, FIG. 5 depicts one embodiment of a computing environment 500, which includes a computing system 512. Examples of well-known computing systems, environments, and/or configurations that may be suitable for use with computer system 512 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 512 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 5, computing system 512, is shown in the form of a general-purpose computing device. The components of computing system 512 may include, but are not limited to, one or more processors or processing units 516, a system memory 523, and a bus 518 that couples various system components including system memory 523 to processor 516.

In one embodiment, processor 516 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 512 may include a variety of computer system readable media. Such media may be any available media that is accessible by computing system 512, and it includes both volatile and non-volatile media, removable and non-removable media.

System memory 523 can include computer system readable media in the form of volatile memory, such as random access memory (RAM) 530 and/or cache memory 532. Computing system 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 518 by one or more data media interfaces. As described below, memory 523 may include at least one program product having a set (e.g., at least one) of program modules that are configured to carry out the functions of embodiments of the invention.

Program/utility 540, having a set (at least one) of program modules 542, may be stored in memory 532 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Alternatively, a recommendation engine processing module, logic, etc., 501 may be provided within computing environment 512.

Computing system 512 may also communicate with one or more external devices 514 such as a keyboard, a pointing device, a display 524, etc.; one or more devices that enable a user to interact with computing system 512; and/or any devices (e.g., network card, modem, etc.) that enable computing system 512 to communicate with one or more other computing devices. Such communication can occur via Input/Output (I/O) interfaces 522. Still yet, computing system 512 can communicate with one or more networks such as a local area network (LAN), a general wide area network (WAN), and/or a public network (e.g., the Internet) via network adapter 520. As depicted, network adapter 520 communicates with the other components of computing system, 512, via bus 518. It should be understood that although not shown, other hardware and/or software components could be used in conjunction with computing system 512. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 5. Computer system/server 512 of FIG. 5 may be practiced in distributed cloud computing environments where tasks are performed by remote processing devices that are linked through a communications network. In a distributed cloud computing environment, program modules may be located in both local and remote computer system storage media including memory storage devices. Computer system/server 512 is capable of being implemented and/or performing any of the functionality set forth hereinabove.

Figure 6:
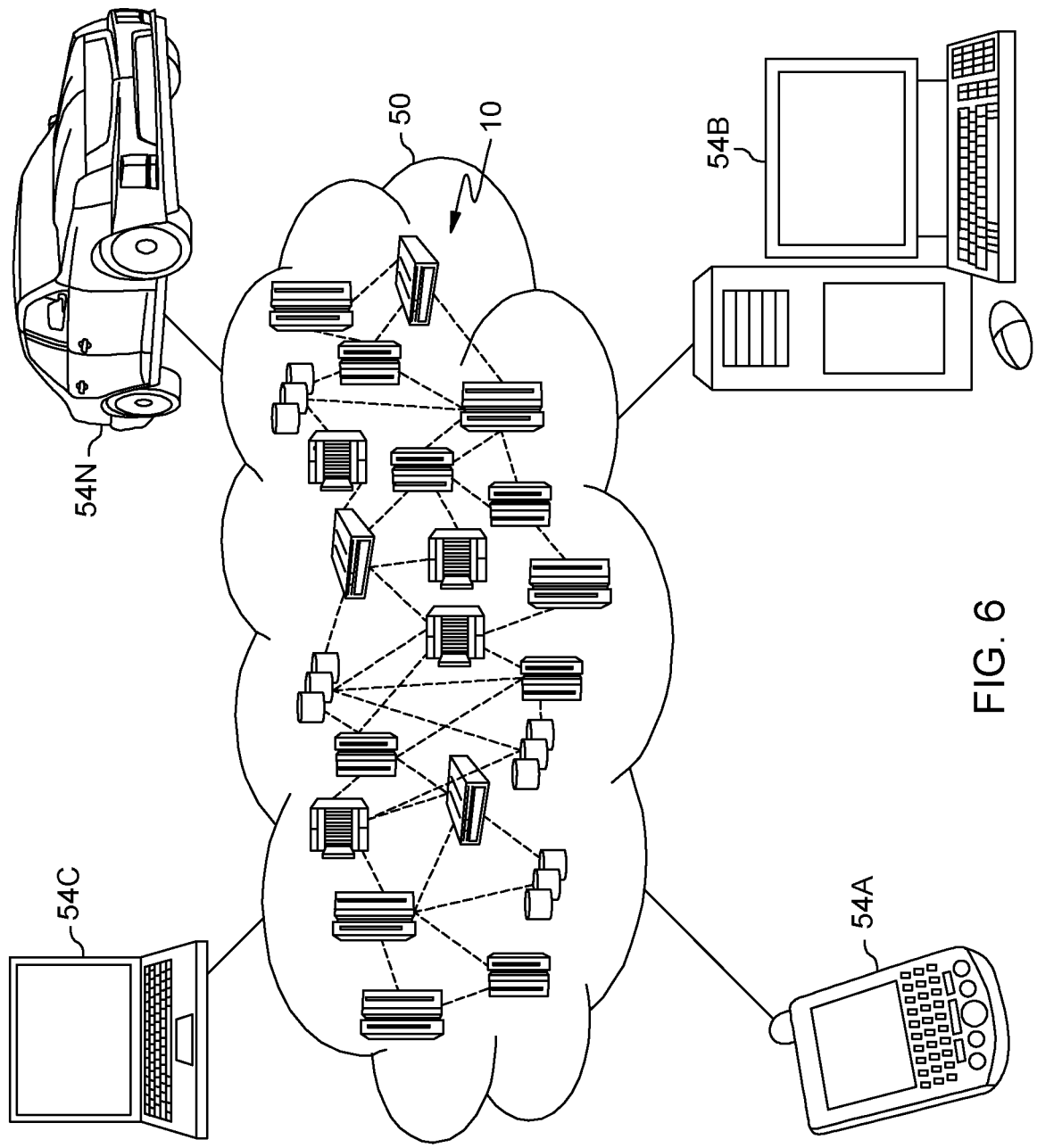
FIG. 6 depicts one embodiment of a cloud computing environment which may facilitate implementing, or be used in association with, one or more aspects of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
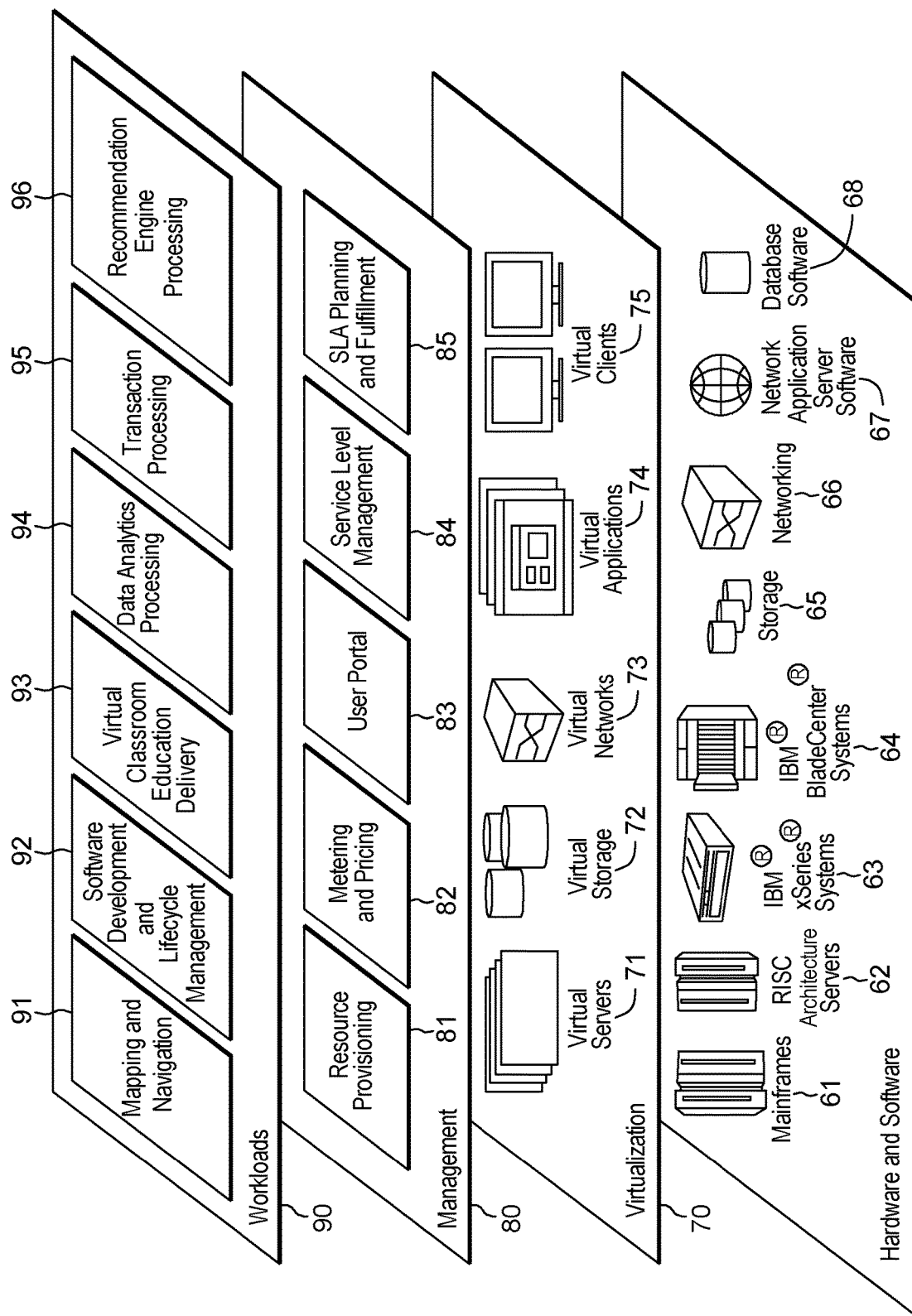
FIG. 7 depicts an example of extraction model layers, which may facilitate implementing recommendation engine processing, in accordance with one or more aspects of the present invention.

Referring to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recommendation engine processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method of identifying one or more complementary products, the computer-implemented method comprising:

obtaining an indication that an individual has selected a product;

based on obtaining the indication that the individual has selected the product, performing, by an artificial-intelligence-based, cognitive recommendation engine, analytics on prior products-related data personal to the individual to produce a complementary items list of complementary items to the product personal to the individual;

ranking, by the cognitive recommendation engine using machine learning, the complementary items of the complementary items list based on the prior products-related data personal to the individual, to produce a ranked complementary items list;

identifying, by the cognitive recommendation engine, one or more commercially available complementary products corresponding to one or more items within the ranked complementary items list; and providing in a prioritized order based on ordering of items in the ranked complementary items list, identifying information for the one or more commercially available complementary products to the individual.

2. The computer-implemented method of claim 1, wherein the performing, by the cognitive recommendation engine, analytics on the prior products-related data personal to the individual comprises analyzing prior products-related data within one or more databases to produce the complementary items list, the one or more databases comprising one or more databases comprising the individual's social media, images of the individual, comments or reviews of the individual, prior product selections of the individual, or other historical, product-related information for the individual.

3. The computer-implemented method of claim 1, wherein the product comprises a clothing product, and the one or more complementary items in the complementary items list comprise complementary items to the selected clothing product preferred by the individual.

4. The computer-implemented method of claim 1, wherein the individual selects the product by one or more of taking a picture of the product, removing the product from a shelf or rack and holding the product, or scanning a code associated with the product.

5. The computer-implemented method of claim 1, wherein the obtaining comprises obtaining via one or more sensors an indication that the individual is at a consumer venue, the product being selected at the consumer venue, and wherein providing the identifying information comprises providing the identifying information to a mobile device of the individual.

6. The computer-implemented method of claim 5, further comprising identifying a location of the consumer venue, and identifying one or more other consumer venues within a specified distance of the location, and wherein providing identifying information further comprises providing identifying information for the at least one commercially available product, including for each commercially available product of the at least one commercially available product an identification of at least one of the consumer venue or other consumer venue(s) offering the commercially available product(s).

7. The computer-implemented method of claim 6, wherein the identifying further comprises identifying by the cognitive recommendation engine commercially available products by accessing one or more company databases for available product inventory at the location or within the specified distance of the location.

8. The computer-implemented method of claim 6, wherein the identifying identifies multiple commercially available products corresponding to one or more items within the complementary items list, and the method further comprises filtering by the cognitive recommendation engine available products of the multiple commercially available products based on one or more of the individual's prior product selections, the individual's consumer venue preferences or price in comparison to price of the product selected.

9. A system for identifying one or more complementary products, the system comprising:

a memory; and a processor communicatively coupled to the memory, wherein the system performs a method comprising:

obtaining an indication that an individual has selected a product;

based on obtaining the indication that the individual has selected the product, performing, by an artificial-intelligence-based, cognitive recommendation engine, analytics on prior products-related data personal to the individual to produce a complementary items list of complementary items to the product personal to the individual;

ranking, by the cognitive recommendation engine using machine learning, the complementary items of the complementary items list based on the prior products-related data personal to the individual, to produce a ranked complementary items list;

identifying, by the cognitive recommendation engine, one or more commercially available complementary products corresponding to one or more items within the ranked complementary items list; and providing in a prioritized order based on ordering of items in the ranked complementary items list, identifying information for the one or more commercially available complementary products to the individual.

10. The system of claim 9, wherein the performing, by the cognitive recommendation engine, analytics on the prior products-related data personal to the individual comprises analyzing prior products-related data within one or more databases to produce the complementary items list, the one or more databases comprising one or more databases comprising the individual's social media, images of the individual, comments or product reviews of the individual, prior product selections of the individual, or other historical, product-related information for the individual.

11. The system of claim 9, wherein the product comprises a clothing product, and the one or more complementary items in the complementary items list comprise complementary items to the selected clothing product preferred by the individual.

12. The system of claim 9, wherein the individual selects the product by one or more of taking a picture of the product, removing the product from a shelf or rack and holding the product, or scanning a code associated with the product.

13. The system of claim 9, wherein the obtaining comprises obtaining via one or more sensors an indication that the individual is at a consumer venue, the product being selected at the consumer venue, and wherein providing the identifying information comprises providing the identifying information to a mobile device of the individual.

14. The system of claim 13, further comprising identifying a location of the consumer venue, and identifying one or more other consumer venues within a specified distance of the location, and wherein providing identifying information further comprises providing identifying information for the at least one commercially available product, including for each commercially available product of the at least one commercially available product an identification of at least one of the consumer venue or other consumer venue(s) offering the commercially available product(s).

15. The system of claim 14, wherein the identifying further comprises identifying by the cognitive recommendation engine commercially available products by accessing one or more company databases for available product inventory at the location or within the specified distance of the location.

16. The system of claim 14, wherein the identifying identifies multiple commercially available products corresponding to one or more items within the complementary items list, and the method further comprises filtering by the cognitive recommendation engine available products of the multiple commercially available products based, on one or more of the individual's prior product selections, the individual's consumer venue preferences or price in comparison to price of the product selected.

17. A computer program product for identifying one or more complementary products, the computer program product comprising:
- at least one computer readable storage medium having computer readable program code embodied therewith, the computer readable program code being executable by at least one processor to perform a method comprising:
  - obtaining an indication that an individual has selected a product;
  - based on obtaining the indication that the individual has selected the product, performing, by an artificial-intelligence-based, cognitive recommendation engine, analytics on prior products-related data personal to the individual to produce a complementary items list of complementary items to the product personal to the individual;
  - ranking, by the cognitive recommendation engine using machine learning, the complementary items of the complementary items list based on the prior products-related data personal to the individual, to produce a ranked complementary items list;
  - identifying, by the cognitive recommendation engine, one or more commercially available complementary products corresponding to one or more items within the ranked complementary items list; and
  - providing in a prioritized order based on ordering of items in the ranked complementary items list, identifying information for the one or more commercially available complementary products to the individual.

18. The computer program product of claim 17, wherein the performing, by the cognitive recommendation engine, analytics on the prior products-related data personal to the individual comprises analyzing prior products-related data within one or more databases to produce the complementary items list, the one or more databases comprising one or more databases comprising the individual's social media, images of the individual, comments or reviews of the individual, prior product selections of the individual, or other historical, product-related information for the individual.

19. The computer program product of claim 17, wherein the product comprises a clothing product, and the one or more complementary items in the complementary items list comprise complementary items to the selected clothing product preferred by the individual.

20. The computer program product of claim 17, wherein the individual selects the product by one or more of taking a picture of the product, removing the product from a shelf or rack and holding the product, or scanning a code associated with the product.

* * * * *